H. B. & H. C. MOULTHROP.
ROAD MACHINE.
APPLICATION FILED MAR. 10, 1910.
975,783.
Patented Nov. 15, 1910.
3 SHEETS—SHEET 3.
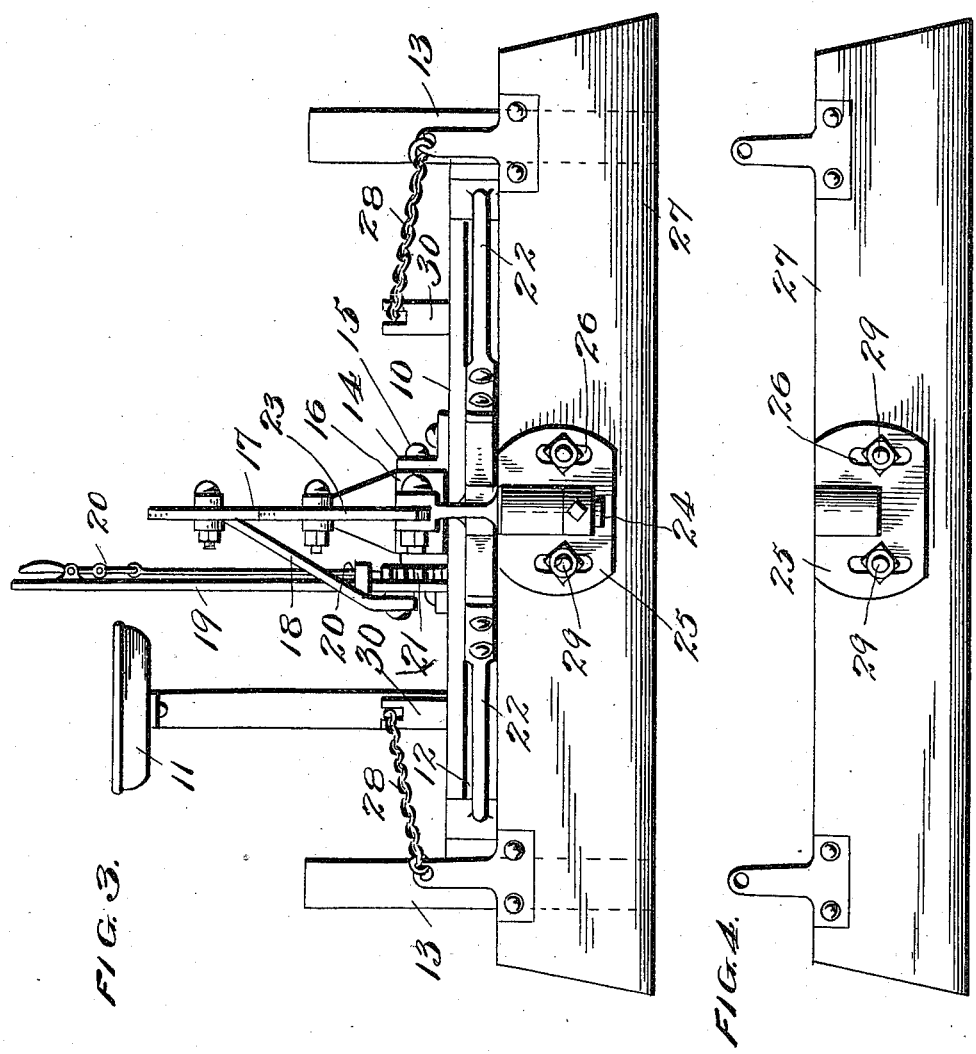
WITNESSES
Chas. W. Davis
A. R. Walton
INVENTORS
Harrison B. Moulthrop
Henry C. Moulthrop
By Milo B. Stevens
Attorneys

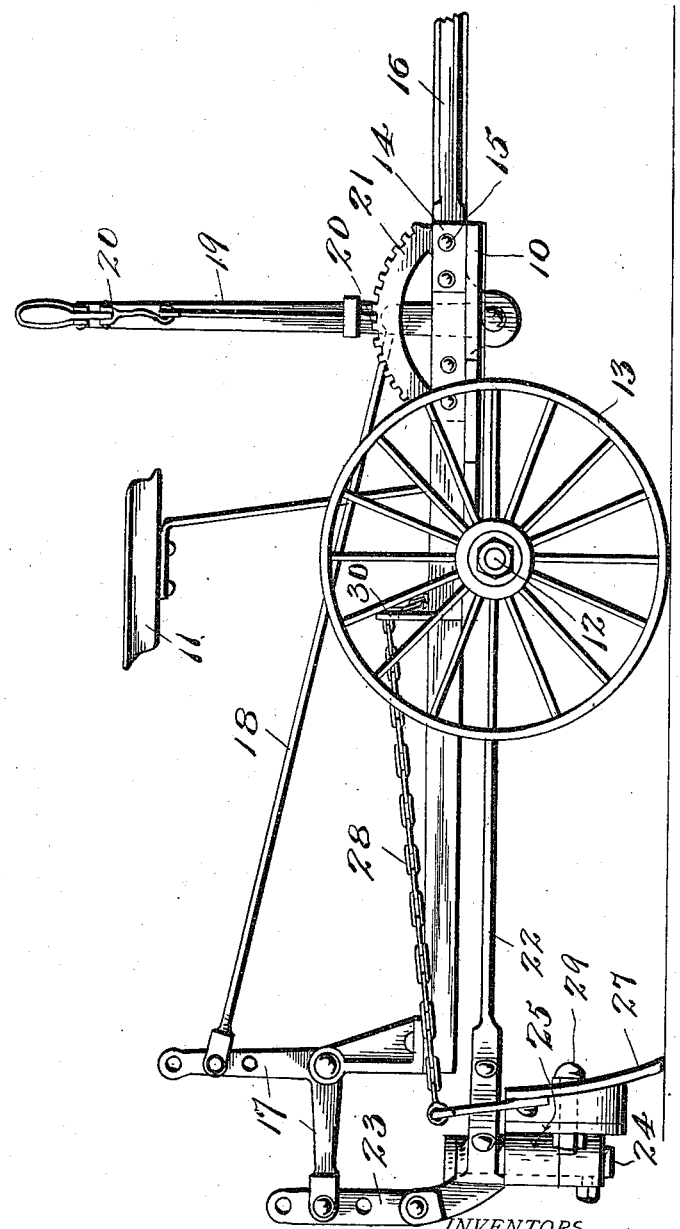

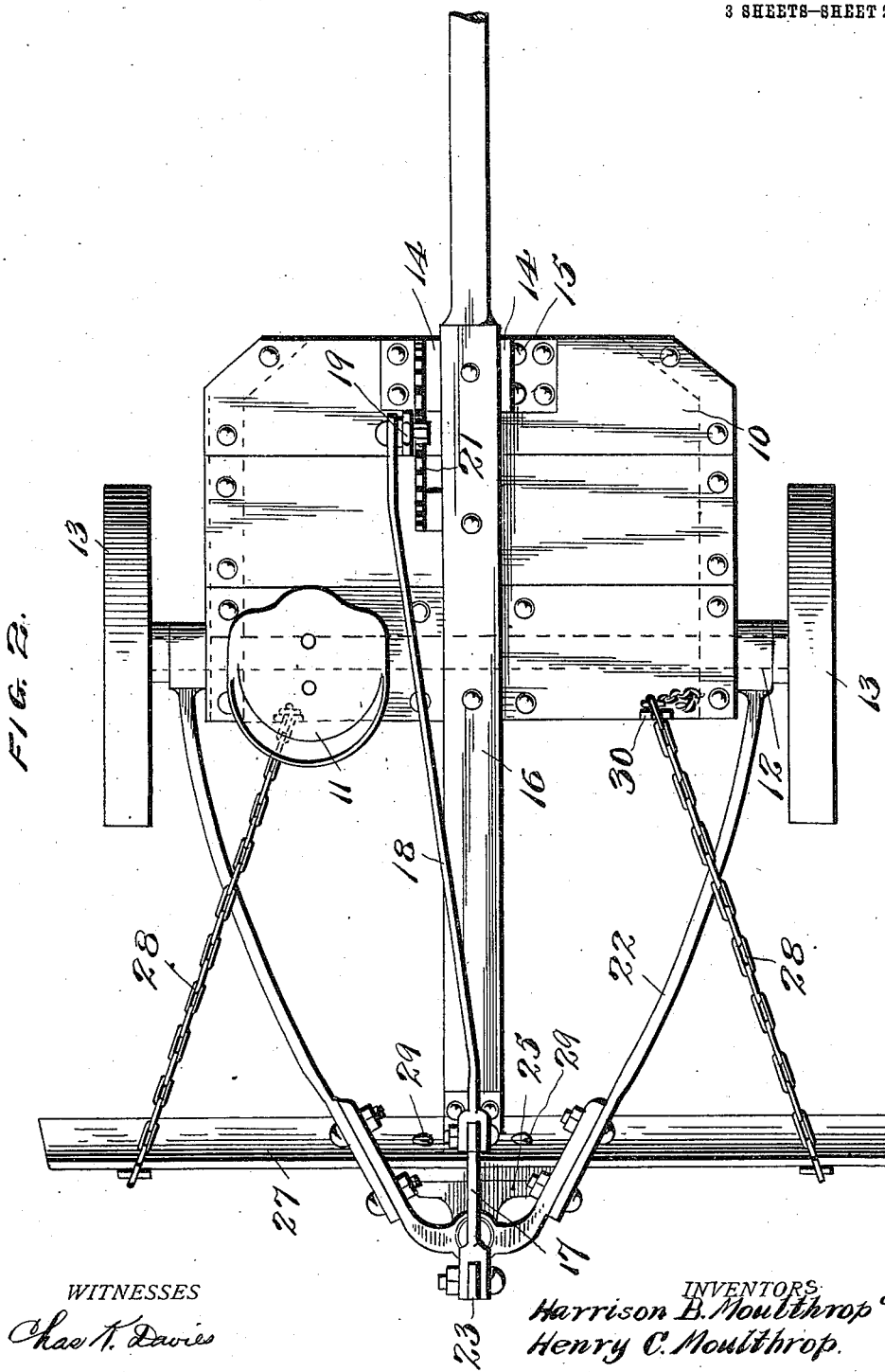

UNITED STATES PATENT OFFICE.

HARRISON B. MOULTHROP AND HENRY C. MOULTHROP, OF CONNEAUTVILLE, PENNSYLVANIA.

ROAD-MACHINE.

975,783.  Specification of Letters Patent.  Patented Nov. 15, 1910.

Application filed March 10, 1910. Serial No. 548,431.

*To all whom it may concern:*

Be it known that we, HARRISON B. MOULTHROP and HENRY C. MOULTHROP, citizens of the United States, residing at Conneautville, in the county of Crawford and State of Pennsylvania, have invented certain new and useful Improvements in Road-Machines, of which the following is a specification.

Our present invention relates to road machines of that character embodying a scraper to grade and level a road bed, our object being to provide a novel construction with respect to the scraper and means for adjusting the same and raising and lowering the same, from and to contact with the road surface.

With this in mind, our invention resides in the structural features to be hereinafter recited, with respect to the accompanying drawing, in which, Figure 1 is a side elevation thereof. Fig. 2 is a top plan view. Fig. 3 is a rear elevation, and, Fig. 4 is a detail view of the scraper removed.

Referring to these figures, 10 indicates the platform of our improved machine, which is flat and supports a driver's seat 11, and has extending beneath and along its rear edge, the axle 12 supporting wheels 13 upon its outer ends. Centrally of its front edge, the platform 10 has spaced upstanding ears 14 through which project bolts 15 and also through the portion of tongue 16 lying therebetween, the said tongue extending rearwardly upon and beyond said platform, and having a bell-crank-lever 17 pivoted thereto at its rear end. The upright arm of lever 17 is connected by a reach rod 18, with an operating lever 19 journaled upon the tongue 16 to the rear of ears 14 and at one side of the driver's seat 11, said lever 19 having a latch mechanism 20 in engagement with a notched quadrant 21 also on said tongue.

At the rear of the platform 10, is a U-shaped frame 22, the ends of its arms being journaled upon the axle 12 inside the wheels 13, whereby it may be adjusted vertically upon said axle as a fulcrum. This frame 22 is provided with a vertical upstanding central arm 23 pivoted to the horizontal rearward arm of bell-crank-lever 17, and with a central depending post 24, upon the latter of which is rotatively mounted a portion of a plate 25 having spaced vertical slots 26.

The scraper comprises a blade 27 extending transversely of, and at the rear of, platform 10, and provided with transversely extending bolts 29 projecting through the slots 26 of plate 25 whereby to secure said scraper in selected vertical adjustment thereto. The blade 27 also has chains 28 extending therefrom adjacent its ends, and being angularly adjustable upon post 24, these chains are adapted to secure the same in selected angular adjustment, by engagement within the slotted upper ends of posts 30 projecting upwardly from the platform 10.

Thus, from the foregoing it will be seen that we provide that the several adjustments may be made, with structural means which are efficient in their operation, and strong, while simple and comparatively inexpensive.

We claim:

1. The combination with a wheeled frame embodying a vertically adjustable part, means to adjust the same, and upstanding slotted posts adjacent the sides thereof, the adjustable part having a depending post, of a scraper blade arranged transversely of the frame, an intermediate plate having a portion journaled upon said post and to which said blade is vertically adjustably secured, and chains extending from blade for engagement with said slotted frame posts to secure said blade in selected angular adjustment upon said post.

2. The combination of a frame comprising a platform, an axle secured thereto and projecting therefrom at its ends, wheels journaled upon the axle ends, a U-shaped frame in the rear of the platform, having its ends journaled upon said axle between the wheels and said platform, and means to raise and lower said U-shaped frame, a scraper blade vertically and angularly adjustable upon and below, said U-shaped frame, and means to secure said blade in selected angular and vertical adjustment.

In testimony whereof we affix our signatures in presence of two witnesses.

HARRISON B. MOULTHROP.
HENRY C. MOULTHROP.

Witnesses:
DAVID E. SHADER,
CHARLES F. HERRICK.